(12) United States Patent
Fujino et al.

(10) Patent No.: US 8,472,099 B2
(45) Date of Patent: Jun. 25, 2013

(54) SCANNING OPTICAL APPARATUS

(75) Inventors: Hitoshi Fujino, Tajimi (JP); Yoshifumi Nakamura, Nagoya (JP); Hiroyuki Ominato, Nagoya (JP); Hiroki Yukawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 334 days.

(21) Appl. No.: 13/051,876

(22) Filed: Mar. 18, 2011

(65) Prior Publication Data

US 2011/0242634 A1 Oct. 6, 2011

(30) Foreign Application Priority Data

Mar. 31, 2010 (JP) .................................. 2010-082068

(51) Int. Cl.
*G02B 26/08* (2006.01)

(52) U.S. Cl.
USPC ........................................................ 359/207.6

(58) Field of Classification Search
USPC ........................................... 359/205.1–207.6
See application file for complete search history.

(56) References Cited

U.S. PATENT DOCUMENTS

| | | | |
|---|---|---|---|
| 5,818,505 A | 10/1998 | Kato | |
| 8,115,981 B2 * | 2/2012 | Kato | ........................ 359/207.5 |
| 2002/0057331 A1 | 5/2002 | Kato | |
| 2003/0128413 A1 | 7/2003 | Suzuki et al. | |
| 2008/0158331 A1 | 7/2008 | Kato | |

FOREIGN PATENT DOCUMENTS

JP H08-076011 A 3/1996

OTHER PUBLICATIONS

The State Intellectual Property Office of the People'S Republic of China, Notification of First Office Action for Chinese Patent Application No. 201110083703.1 (counterpart Chinese patent application), issued Nov. 5, 2012.

* cited by examiner

*Primary Examiner* — Jennifer L. Doak
(74) *Attorney, Agent, or Firm* — Baker Botts L.L.P.

(57) ABSTRACT

A scanning optical apparatus includes: a light source; a first optical element configured to convert light emitted from the light source into a beam of light; a second optical element configured to convert the beam of light having passed through the first optical element into a linear image extending in a main scanning direction; a deflecting mirror configured to deflect the beam of light having passed through the second optical element in the main scanning direction; and a third optical element configured to convert the beam of light having been deflected by the deflecting mirror into a spot-like image and focus it on a target surface to be scanned. The third optical element is a single lens having a pair of opposite lens surfaces, and each of the pair of lens surfaces is aspheric in a main scanning plane to satisfy the formula:

$$\left| \left( 1 - \frac{S_k(y_1, y_2)}{f_t(y_1, y_2)} \right) \cdot h(y_1, y_2) \right| < \frac{r_e \min}{2}.$$

7 Claims, 9 Drawing Sheets

Coefficients expressing shapes of lens surfaces and characteristics

| Used Wavelength | | λ [nm] | 788 |
|---|---|---|---|
| F-theta lens Refractive index | | N | 1.503 |
| Incident angle to Polygon mirror | | θi [deg] | 80 |
| From Polygon mirror to F-theta lens | | e [mm] | 44.5 |
| F-theta lens Center thickness | | d [mm] | 11 |
| From F-theta lens to Target surface | | fb [mm] | 133.4 |
| F-theta coefficient | | k [mm] | 160.0 |
| Maximum scanning range | | [mm] | ±110.0 |
| Polygon mirror Maximum scanning angle | | θmax [deg] | 39.4 |
| From Polygon mirror to Natural convergent point | | fc [mm] | 414.5 |
| Natural convergent Main F number | | Fno | 177.1 |

| First surface (Incident-side lens surface) | | Second surface (Emission-side lens surface) | |
|---|---|---|---|
| $A_2$ | 5.264500.E-03 | $A_2$ | 1.081549.E-03 |
| $A_4$ | -2.612014.E-06 | $A_4$ | -1.764991.E-06 |
| $A_6$ | 9.299667.E-10 | $A_6$ | 2.392057.E-10 |
| $A_8$ | -1.312331.E-13 | $A_8$ | 8.964153.E-14 |
| $A_{10}$ | -1.313104.E-17 | $A_{10}$ | -3.348445.E-17 |
| $A_{12}$ | 3.985370.E-21 | $A_{12}$ | 2.013932.E-21 |
| r | -21.93137228 | r | -12.15315283 |
| $B_2$ | 3.410302.E-04 | $B_2$ | 1.737527.E-04 |
| $B_4$ | 5.068271.E-07 | $B_4$ | -3.054069.E-08 |
| $B_6$ | -1.152162.E-09 | $B_6$ | -1.206831.E-10 |
| $B_8$ | 9.845056.E-13 | $B_8$ | 9.826571.E-14 |
| $B_{10}$ | -3.857809.E-16 | $B_{10}$ | -2.809160.E-17 |
| $B_{12}$ | 5.628748.E-20 | $B_{12}$ | 2.180667.E-21 |
| Lens shift amount | D1 [mm] | 0.58 | |
| Lens tilt amount | β1 [deg] | 0.2 | |
| Lens surface shift amount | D2 [mm] | 0.062 | |
| Lens surface tilt amount | β2 [deg] | 0.39 | |

Coefficients expressing shapes of lens surfaces and characteristics

| Used Wavelength | | λ [nm] | 788 |
|---|---|---|---|
| F-theta lens Refractive index | | N | 1.503 |
| Incident angle to Polygon mirror | | θi [deg] | 80 |
| From Polygon mirror to F-theta lens | | e [mm] | 44.5 |
| F-theta lens Center thickness | | d [mm] | 11 |
| From F-theta lens to Target surface | | fb [mm] | 133.4 |
| F-theta coefficient | | k [mm] | 160.0 |
| Maximum scanning range | | [mm] | ±110.0 |
| Polygon mirror Maximum scanning angle | | θmax [deg] | 39.4 |
| From Polygon mirror to Natural convergent point | | fc [mm] | 414.5 |
| Natural convergent Main F number | | Fno | 177.1 |

| First surface (Incident-side lens surface) | | Second surface (Emission-side lens surface) | |
|---|---|---|---|
| $a_{2,0}$ | -3.230416.E-02 | $a_{2,0}$ | -4.632615.E-02 |
| $a_{0,2}$ | 5.404792.E-03 | $a_{0,2}$ | 1.236455.E-03 |
| $a_{2,2}$ | 5.015871.E-05 | $a_{2,2}$ | 2.294436.E-05 |
| $a_{0,4}$ | -3.081470.E-06 | $a_{0,4}$ | -2.181857.E-06 |
| $a_{2,4}$ | -7.925122.E-08 | $a_{2,4}$ | -2.270360.E-08 |
| $a_{0,6}$ | 1.545893.E-09 | $a_{0,6}$ | 6.503557.E-10 |
| $a_{2,6}$ | 6.894860.E-11 | $a_{2,6}$ | 6.314848.E-12 |
| $a_{0,8}$ | -5.114629.E-13 | $a_{0,8}$ | -7.414789.E-14 |
| $a_{2,8}$ | -3.195494.E-14 | $a_{2,8}$ | 3.539055.E-15 |
| $a_{0,10}$ | 9.555232.E-17 | $a_{0,10}$ | -1.764976.E-17 |
| $a_{2,10}$ | 7.511501.E-18 | $a_{2,10}$ | -2.411179.E-18 |
| $a_{0,12}$ | -7.216909.E-21 | $a_{0,12}$ | 4.944695.E-21 |
| $a_{2,12}$ | -7.29691E-22 | $a_{2,12}$ | 3.61077E-22 |
| Lens shift amount | D1 [mm] | | 0.58 |
| Lens tilt amount | β1 [deg] | | 0.2 |
| Lens surface shift amount | D2 [mm] | | 0.062 |
| Lens surface tilt amount | β2 [deg] | | 0.39 |

SCANNING OPTICAL APPARATUS

CROSS-REFERENCE TO RELATED APPLICATION(S)

This application claims priority from Japanese Patent Application No. 2010-082068 filed on Mar. 31, 2010, the disclosure of which is incorporated herein by reference in its entirety.

TECHNICAL FIELD

The present invention relates to a scanning optical apparatus suitable for use in an electrophotographic image forming apparatus.

BACKGROUND ART

In an electrophotographic image forming apparatus, there is provided a scanning optical apparatus which blinks a laser beam in accordance with an image signal to expose a photoconductor with light. The scanning optical apparatus is configured to deflect a laser beam periodically by a light deflector comprising a rotary polygon mirror and to convert the deflected laser beam into a spot-like image formed on the photoconductor (i.e., target surface to be scanned) such as a photoconductor drum using an imaging optics having f-theta (fθ) characteristics.

With increased requirements for reducing the size and the cost of the scanning optical apparatus, a study has been made to form an imaging optics comprising one lens only. See, for example, Japanese Patent No. 3303558 corresponding to U.S. Pat. No. 5,818,505 (hereinafter referred to as Patent document 1).

In order to highly accurately expose the photoconductor to light using the scanning optical apparatus, it is preferable that curvature of field is successfully compensated over the entire region of the target surface and the spot diameter is uniform. To achieve this, according to the scanning optical apparatus disclosed in Patent document 1, a lateral magnification m in the main scanning direction is specified within a predetermined range.

However, since a conditional formula disclosed in Patent document 1 contains the radius of curvature of the lens surface at the center of the main scanning direction, there is a drawback that the f-theta lens can not be designed using an expression formula in which the radius of curvature of the lens surface in the main scanning plane is undefined.

Further, Patent document 1 discloses a conditional formula for the magnification in the main scanning plane. However, since the position of the back principal point of the f-theta lens within the main scanning plane is not taken into consideration by this conditional formula, the magnification is inaccurate and an actually manufactured f-theta lens may disadvantageously generates jitter greater than estimation. In the conditional formula for the magnification in the main scanning plane, the eccentric amount of the mirror surface of the deflecting mirror, the incident angle of the beam of light onto the mirror surface of the deflecting mirror, and the emission angle of the beam of light from the mirror surface of the deflecting mirror are not taken into consideration. This may also result in that an actually manufactured f-theta lens disadvantageously generates jitter greater than estimation.

In view of the above, it would be desirable to provide a scanning optical apparatus, in which the lens can be designed independently of forms of the formula for defining the lens surface, and by which an occurrence of jitter can be more reliably suppressed.

SUMMARY OF THE INVENTION

According to one aspect of the present invention, there is provided a scanning optical apparatus comprising: a light source; a first optical element configured to convert light emitted from the light source into a beam of light; a second optical element configured to convert the beam of light having passed through the first optical element into a linear image extending in a main scanning direction; a deflecting mirror configured to deflect the beam of light having passed through the second optical element in the main scanning direction; and a third optical element configured to convert the beam of light having been deflected by the deflecting mirror into a spot-like image and focus it on a target surface to be scanned.

In this scanning optical apparatus, the third optical element is a single lens having a pair of opposite lens surfaces, and each of the pair of lens surfaces is aspheric in a main scanning plane. Further, if a distance in the main scanning direction from a point on an incident-side surface of the pair of lens surfaces, through which a principal ray of a scanning light passes, to an optical axis of the incident-side surface is $y_1$; a distance in the main scanning direction from a point on an emission-side surface of the pair of lens surfaces, through which the principal ray of the scanning light passes, to an optical axis of the emission-side surface is $y_2$; an aspheric shape of each of the pair of lens surfaces is defined by $z_j = f(y)$; a refractive index of a material from which the third optical element is made is n; a distance between the incident-side surface and the emission-side surface of the third optical element is $D(y_1, y_2)$; a radius of curvature $R_1(y_1)$ at the incident-side surface and a radius of curvature $R_2(y_2)$ at the emission-side surface are obtained by the following formula for calculating a radius of curvature:

$$R_j(y) = \frac{\left\{1 + \left(\frac{dz_j(y)}{dy}\right)^2\right\}^{\frac{3}{2}}}{\frac{d^2 z_j(y)}{dy^2}}; \quad (1)$$

a focal distance $f_t(y_1, y_2)$ in the main scanning plane is given by the formula:

$$f_t(y_1, y_2) = \frac{1}{(n-1)\left(\frac{1}{R_1(y_1)} - \frac{1}{R_2(y_2)}\right) + \frac{(n-1)^2 D(y_1, y_2)}{n R_1(y_1) R_2(y_2)}}; \quad (2)$$

a distance from a back principal point of the third optical element to the target surface is $S_k(y_1, y_2)$; an incident angle of the beam of light onto a mirror surface of the deflecting mirror is $\theta_1$; an emission angle of the beam of light from the mirror surface of the deflecting mirror is $\theta_e(y_1, y_2)$; an eccentric amount of the mirror surface of the deflecting mirror is $d(y_1, y_2)$; a deviation amount $h(y_1, y_2)$ of the beam of light generated due to a level difference between mirror surfaces that is derived from an eccentricity of the deflecting mirror is given by the formula:

$$h(y_1, y_2) = \frac{d(y_1, y_2) \cdot \sin(\theta_e(y_1, y_2) - \theta_i)}{\cos\theta_e(y_1, y_2)\cos((\theta_e(y_1, y_2) - \theta_i)/2)}; \quad (3)$$

and
a minimum value of $1/e^2$ beam radius on the target surface in the main scanning direction is $r_e\min$,
the third optical element has an aspheric shape in the main scanning plane, which satisfies the formula:

$$\left|\left(1 - \frac{S_k(y_1, y_2)}{f_t(y_1, y_2)}\right) \cdot h(y_1, y_2)\right| < \frac{r_e\min}{2}. \quad (4)$$

BRIEF DESCRIPTION OF THE DRAWINGS

To better understand the claimed invention, and to show how the same may be carried into effect, reference will now be made, by way of example only, to the accompanying drawings, in which:

DESCRIPTION OF EMBODIMENTS

A detailed description will be given of illustrative embodiments of the present invention with reference to the accompanying drawings where necessary.

Figure 1:
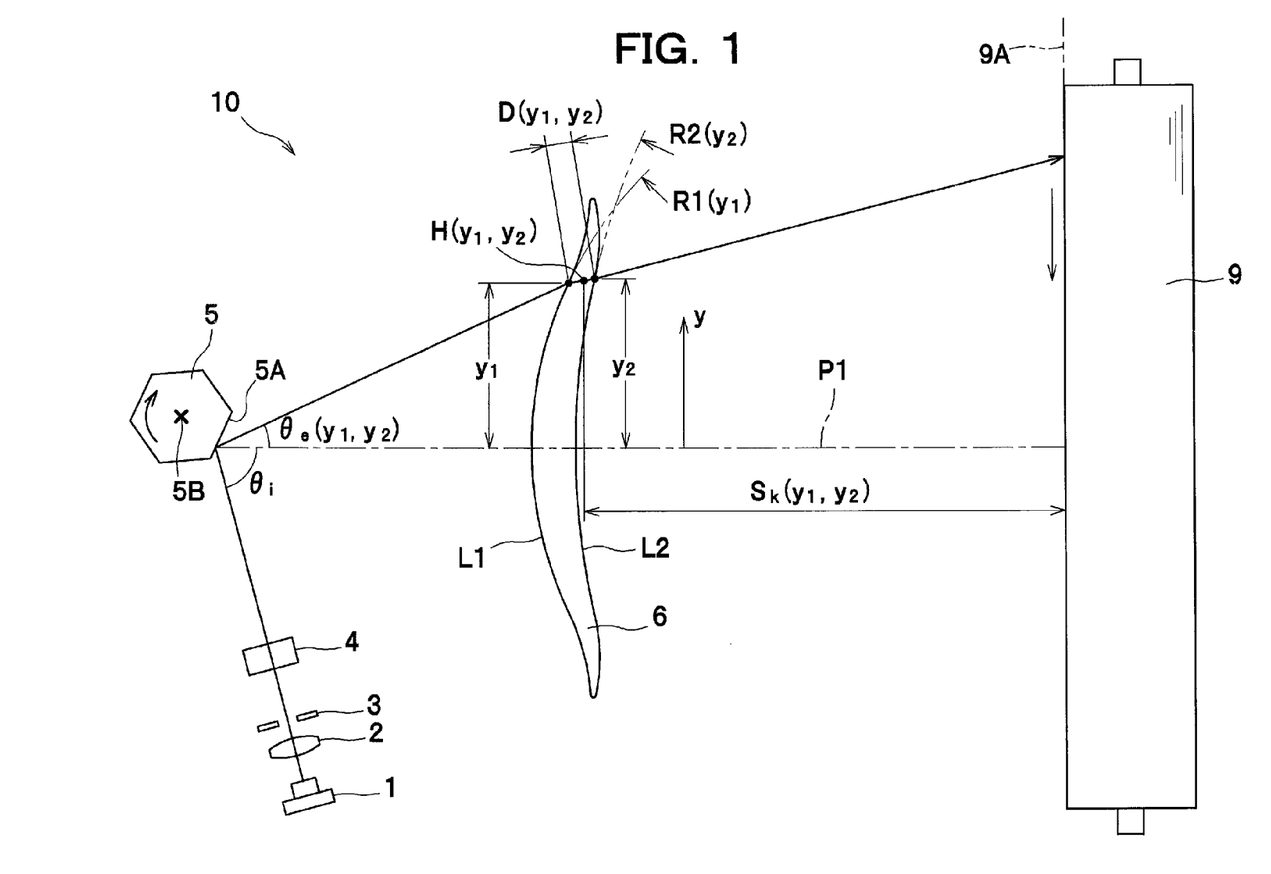
FIG. 1 is a sectional view of a scanning optical apparatus according to one exemplary embodiment taken along a main scanning plane.

As seen in FIG. 1, a scanning optical apparatus 10 according to one exemplary embodiment includes a light source 1, a coupling lens 2 as an example of a first optical element, an aperture stop 3, a cylindrical lens 4 as an example of a second optical element, a polygon mirror 5 as an example of a deflecting mirror, and a f-theta lens (fθ lens) 6 as an example of a third optical element. With this configuration, the scanning optical apparatus 10 condenses a laser beam emitted from the light source 1 into a spot focused on a target surface 9A of a photoconductor drum 9 and rapidly sweeps the target surface 9A with the laser beam.

The light source 1 is, for example, a semiconductor laser.

The coupling lens 2 is a lens configured to convert a laser beam emitted from the light source 1 into a convergent light.

The aperture stop 3 is a member having an opening by which the diameter of the beam of light converted by the coupling lens 2 and passing through the opening is limited.

The cylindrical lens 4 is a lens configured to convert the beam of light having passed through the coupling lens 2 and the aperture stop 3 into a liner image extending in the main scanning direction and focus it on a mirror surface 5A of the polygon mirror 5.

The polygon mirror 5 has a plurality of mirror surfaces 5A disposed equidistantly from an axis of rotation 5B; the polygon mirror 5 shown in FIG. 1 has six mirror surfaces 5A. The polygon mirror 5 spins at a constant rotational speed around the axis of rotation 5B and deflects the beam of light having passed through the cylindrical lens 4 in the main scanning direction.

The f-theta lens 6 is configured to convert the beam of light having reflected and thus deflected by the polygon mirror 5 into a spot-like image and focus it on the target surface 9A as well as to correct an optical face tangle error of the mirror surfaces 5A of the polygon mirror 5. The scanning optical apparatus 10 has only one f-theta lens 6. The f-theta lens 6 has f-theta characteristics so that the beam of light deflected at a constant angular velocity by the polygon mirror 5 is converted into a beam of light that scans the target surface 9A at a constant linear velocity. The f-theta lens 6 has a pair of opposite lens surfaces L1, L2, namely, an incident-side (polygon mirror 5 side) lens surface L1 and an emission-side (target surface 9A side) lens surface L2. These lens surfaces L1, L2 are aspheric in a main scanning plane and they are both toric surfaces. Further, the curvature of each lens surface L1, L2 in the main scanning plane and in a sub-scanning plane (i.e., section orthogonal to the main scanning direction) changes continuously within an effective region.

In this embodiment, the shape of the lens surface L1, L2 is not limited to a specific shape. According to Patent document 1, a formula containing spherical terms and defining a lens surface is exemplified. However, according to this embodiment, the lens surface may be defined in the main scanning direction by the following formula:

$$z_j = \sum_{i=1}^{n} A_i y^i \quad (5)$$

where $A_i$ is a coefficient. And a curvature of the lens surface in the sub-scanning plane may be changed continuously within the effective region of the lens surface from a point on the optical axis toward both outer ends of the lens surface.

Further, the lens surface can also be expressed by a bivariate polynomial with respect to the main scanning direction (y) and the sub-scanning direction (x), such as given by the formula:

$$z_j = f(x, y) = \sum_m \sum_n (a_{m,n}) x^m y^n \quad (6)$$

where $a_{m,n}$ is a coefficient.

According to this embodiment, since design formulae for the lens can be freely selected as described above, the possibility of lens design can be greatly expanded. Further, when correction is required for lens surfaces of a molded lens, the amount of correction can be easily added and thus a highly accurate manufacture of the lens can be performed with ease.

As long as the following conditions are satisfied, the shape of the f-theta lens 6 is not limited to a specific shape. It is however preferable that one of or both of the lens surfaces L1, L2 is symmetrical in the main scanning direction with respect to the sub-scanning plane passing through the optical axis. This makes it possible to easily manufacture and inspect the f-theta lens 6.

It is further preferable that one of or both of the lens surfaces L1, L2 is inclined in the main scanning plane with respect to a normal line P1 extending from a scanning center on the target surface to be scanned (i.e., image forming position on the target surface 9A when the beam of light is orthogonally incident from the f-theta lens 6 onto the target surface 9A). By this arrangement, the following conditions are more likely to be satisfied even if the lens surfaces L1, L2 are symmetrical in the main scanning direction with respect to the sub-scanning plane passing through the optical axis.

It is also preferable that one of or both of the lens surfaces L1, L2 are configured such that an intersection point between the optical axis of the lens surface L1, L2 and the lens surface L1, L2 is shifted in the main scanning direction with respect to the normal line P1. By this arrangement too, the following conditions are more likely to be satisfied even if the lens surfaces L1, L2 are symmetrical in the main scanning direction.

The f-theta lens 6 may be manufactured, for example, by plastic injection molding or glass molding.

Figure 2:
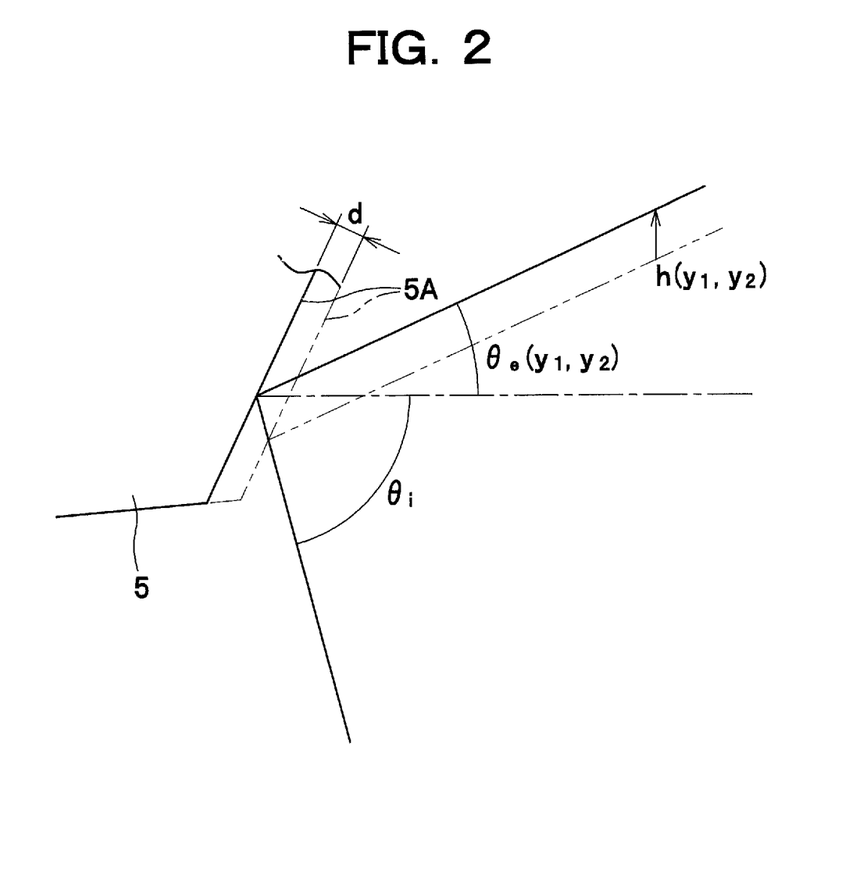
FIG. 2 is an enlarged view explaining an eccentric amount of a mirror surface of a polygon mirror.

As best seen in FIG. 2, the polygon mirror 5 is susceptible to a level difference between the mirror surfaces 5A (i.e., position shift due to difference between the reflective mirror surfaces) because of a fitting error upon attachment of the polygon mirror 5 to the axis of rotation 5B, a variation of the distance between the center of rotation and each of the mirror surfaces 5A, and the like. If such difference arises between the reflective mirror surfaces 5A, the reflecting point on the polygon mirror 5 moves back and forth. According to this change of the reflecting point, an image forming point is slightly shifted, and jitter occurs in the exposure pattern on the photoconductor drum 9 in accordance with a period of the mirror surface 5A.

For the purpose of suppressing jitter caused by the polygon mirror 5, the scanning optical apparatus 10 according to this embodiment is configured to satisfy the following conditions.

If a height (distance) y in the main scanning direction from a point on an incident-side surface of the pair of lens surfaces L1, L2 of the f-theta lens 6, through which a principal ray of a scanning light passes, to the optical axis of the incident-side surface is $y_1$; a height (distance) y in the main scanning direction from a point on an emission-side surface of the pair of lens surfaces L1, L2, through which the principal ray of the scanning light passes, to the optical axis of the emission-side surface is $y_2$; an aspheric shape of each of the pair of lens surfaces L1, L2 is defined by $z_j=f(y)$; a refractive index of a material from which the f-theta lens 6 is made is n; a distance between the incident-side surface and the emission-side surface of the f-theta lens 6 is $D(y_1, y_2)$, a radius of curvature $R_1(y_1)$ in the main scanning plane for each point at the incident-side surface and a radius of curvature $R_2(y_2)$ in the main scanning plane for each point at the emission-side surface are expressed by the following formula:

$$R_j(y) = \frac{\left\{1+\left(\frac{dz_j(y)}{d_y}\right)^2\right\}^{\frac{3}{2}}}{\frac{d^2 z_j(y)}{dy^2}}. \quad (1)$$

By using $R_j(y)$, a focal distance $f_t(y_1, y_2)$ in the main scanning plane corresponding to each position y is given by the formula:

$$f_t(y_1, y_2) = \frac{1}{(n-1)\left(\frac{1}{R_1(y_1)} - \frac{1}{R_2(y_2)}\right) + \frac{(n-1)^2 D(y_1, y_2)}{n R_1(y_1) R_2(y_2)}}. \quad (2)$$

If a distance from a back principal point $H(y_1, y_2)$ of the f-theta lens 6 to the target surface 9A is $S_k(y_1, y_2)$; an incident angle of the beam of light onto the mirror surface 5A of the polygon mirror 5 is $\theta_i$; an emission angle of the beam of light from the mirror surface 5A of the polygon mirror 5 is $\theta_e(y_1, y_2)$; an eccentric amount of the mirror surface 5A of the polygon mirror 5 is $d(y_1, y_2)$, a deviation amount $h(y_1, y_2)$ of the beam of light generated due to a level difference (eccentricity) between the mirror surfaces 5A that is derived from an eccentricity of the polygon mirror 5 is given by the formula:

$$h(y_1, y_2) = \frac{d(y_1, y_2) \cdot \sin(\theta_e(y_1, y_2) - \theta_i)}{\cos\theta_e(y_1, y_2)\cos((\theta_e(y_1, y_2) - \theta_i)/2)}. \quad (3)$$

The lateral magnification m in the main scanning direction is obtained by the following formula:

$$m=1-S_k(y_1,y_2)/f_t(y_1,y_2).$$

Therefore, the jitter amount J is expressed by multiplying the deviation amount h by the lateral magnification m, and given by the formula:

$$J=(1-S_k(y_1,y_2)/f_t(y_1,y_2))\cdot h(y_2,y_2).$$

Generally speaking, jitter becomes visually noticeable in an image formed by exposure when the pitch between two dots on the image shifts half or more of one dot. For this reason, it is necessary that the jitter amount J is within this range. On the contrary, the beam diameter in the main scanning direction is set in accordance with required specifications for printing. The beam diameter in the main scanning direction is generally set to approximately two times the dot pitch. For example, in the case of a laser beam printer with resolution of 600 dpi, the dot pitch is 25.4/600=0.0423 mm, and the beam diameter in the main scanning direction is set to approximately two times the dot pitch, that is, approximately 84.6 μm. Therefore, if jitter is suppressed less than or equal to half the beam diameter, the jitter does not become visually noticeable.

Accordingly, an excellent image can be obtained, if the minimum value of $1/e^2$ beam radius on the target surface 9A in the main scanning direction is $r_e$min and the following formula is satisfied:

$$\left|\left(1 - \frac{S_k(y_1, y_2)}{f_t(y_1, y_2)}\right) \cdot h(y_1, y_2)\right| < \frac{r_e \min}{2}. \quad (4)$$

In this conditional formula, the position $H(y_1, y_2)$ of the back principal point within the main scanning plane of the f-theta lens 6, the eccentric amount $d(y_1, y_2)$ of the polygon mirror 5, the incident angle $\theta_i$ of the beam of light onto the mirror surface 5A of the polygon mirror 5, the emission angle $\theta_e(y_1, y_2)$ of the beam of light from the mirror surface 5A of the polygon mirror 5 are taken into consideration, so that there is only a small difference as compared to an actually generated jitter. According to this embodiment, it is possible to more reliably suppress jitter as compared to the conventional technique.

Figure 3:
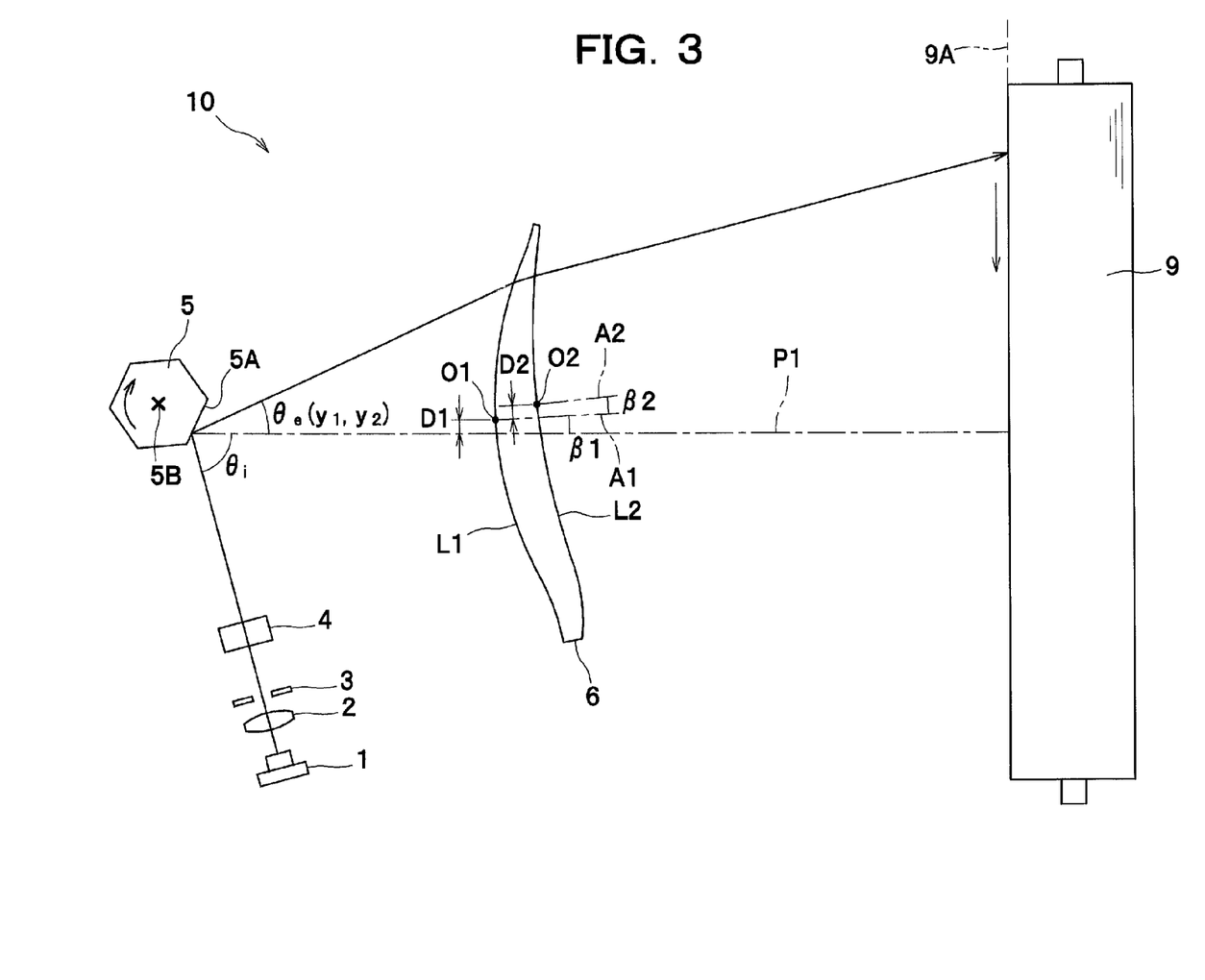
FIG. 3 is a view explaining shift and tilt of an f-theta lens according to one preferred embodiment.

As a scanning optical apparatus 10 which satisfies the above formula (4) according to this embodiment, the following Examples are exemplified. In order to easily satisfy the formula (4), as best seen in FIG. 3, the lens surface L1 of the scanning optical apparatus 10 according to the following Examples is configured such that the first optical axis A1 defined as the optical axis of the lens surface L1 is inclined by angle (i.e., tilt angle) β1 with respect to the normal line P1 extending from the scanning center (i.e., image forming position on the target surface 9A when the beam of light is orthogonally incident from the f-theta lens 6 onto the target surface 9A) of the target surface 9, and the center of the lens surface L1 (i.e., intersection point O1 between the first optical axis A1 and the lens surface L1) is shifted by the shift amount D1 with respect to the normal line P1. Further, the second optical axis A2 defined as the optical axis of the lens surface L2 is inclined by angle (i.e., tilt angle) β2 with respect to the first optical axis A1, and the center of the lens surface L2 (i.e., intersection point O2 between the second optical axis A2 and the lens surface L2) is shifted by the shift amount D2 with respect to the first optical axis A1. Therefore, the distance from the mirror surface 5A of the polygon mirror 5 to the lens surface L1, the distance from the lens surface L1 to the lens surface L2, and the distance from the lens surface L2 to the target surface 9A can be adjusted. As a result, even if the lens surface L1 is symmetrical with respect to the sub-scanning plane PL1 passing through the first optical axis A1 and the lens surface L2 is symmetrical with respect to the sub-scanning plane PL2 passing through the second optical axis A2, the formula (4) can be satisfied. In other words, the f-theta lens 6 can be easily fabricated, while enabling a high-definition image exposure.

EXAMPLE 1

Description will be given of an example in which the f-theta lens 6 is expressed by the above formula (5). In the f-theta lens 6 of the scanning optical apparatus according to Example 1, the shapes of the lens surface L1 (i.e., incident-side lens surface) and the lens surface L2 (i.e., emission-side lens surface) in the main scanning direction and the sub-scanning direction are given by the following formula.

Figure 4:
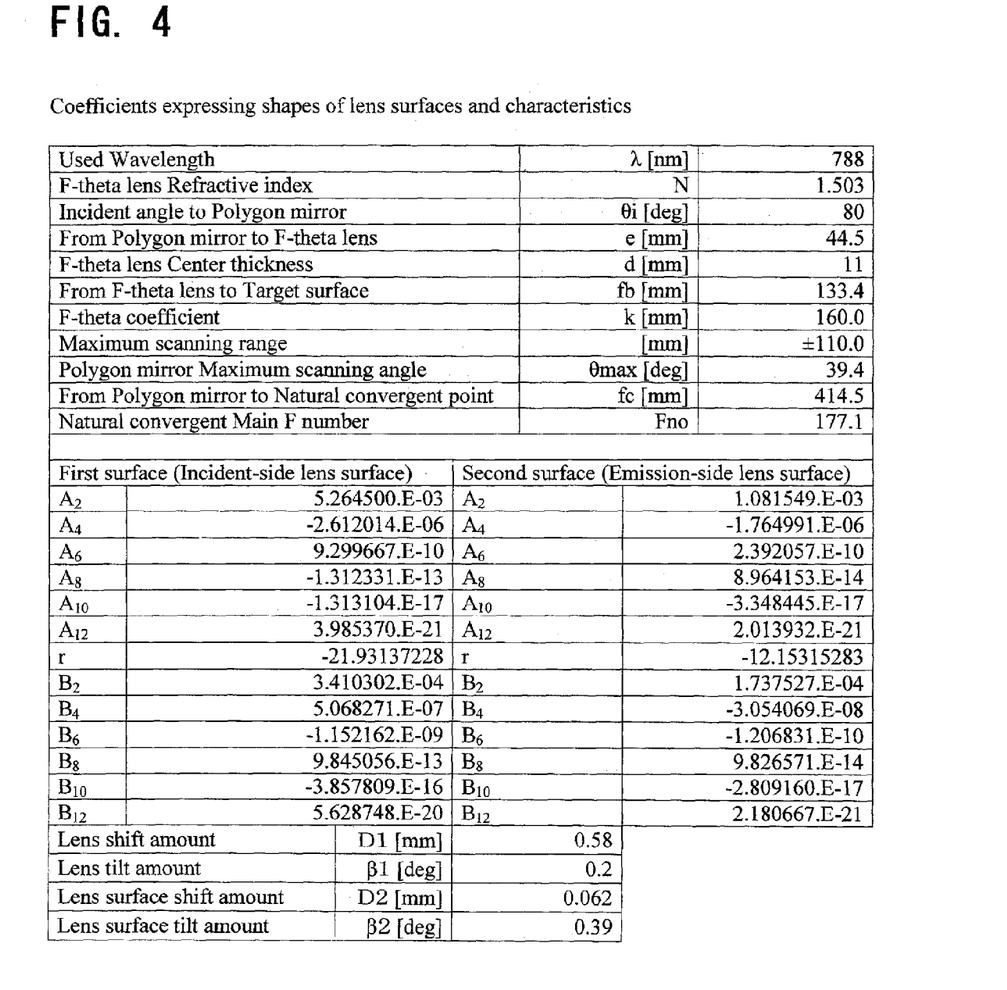
FIG. 4 is a table showing relations between coefficients expressing the shapes of lens surfaces according to Example 1 and characteristics.
Figure 5:
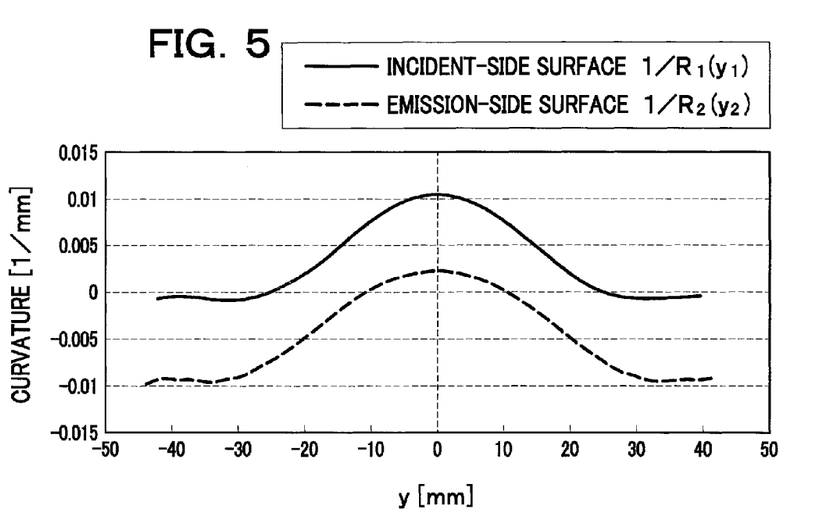
FIG. 5 is a graph showing curvature distribution of the lens surfaces according to Example 1.

When the intersection point between each lens surface of the f-theta lens 6 and the optical axis is taken as an origin, the optical axis direction is taken as an z-axis, and an axis orthogonal to the optical axis in the main scanning plane is taken as a y-axis, the meridional direction corresponding to the main scanning direction is given by the following formula:

$$z = A_2 y^2 + A_4 y^4 + A_6 y^6 + A_8 y^8 + A_{10} y^{10} + A_{12} y^{12} \quad (7)$$

where $A_2, \ldots A_{12}$ are constants, and values at the incident-side lens surface and at the emission-side lens surface are shown in FIG. 4. Distribution of the curvature in the main scanning direction obtained by this formula is shown in FIG. 5.

The sagittal direction corresponding to the sub-scanning direction can be given by the following formula:

$$s = \frac{\frac{x^2}{r'}}{1 + \sqrt{1 - \left(\frac{x}{r'}\right)^2}}. \quad (8)$$

Herein, if the radius of curvature in the sub-scanning plane passing through the optical axis is r, the radius of curvature r' in a sub-scanning plane at a point on the y coordinate of the lens surface is given by the following formula:

$$r' = r(1 + B_2 y^2 + B_4 y^4 + B_6 y^6 + B_8 y^8 + B_{10} y^{10} + B_{12} y^{12}) \quad (9)$$

where $r, B_2, \ldots B_{12}$ are constants, and values at the incident-side lens surface and at the emission-side lens surface are shown in FIG. 4.

The f-theta lens 6 is configured such that the emission-side lens surface is shifted with respect to the incident-side lens surface by the shift amount D2 shown in FIG. 4 and is inclined at the tilt angle β2, and that the incident-side lens surface is shifted with respect to the normal line P1 by the shift amount D1 shown in FIG. 4 and is inclined at the tilt angle β1. Other arrangements and characteristics are shown in FIG. 4.

Figure 6:
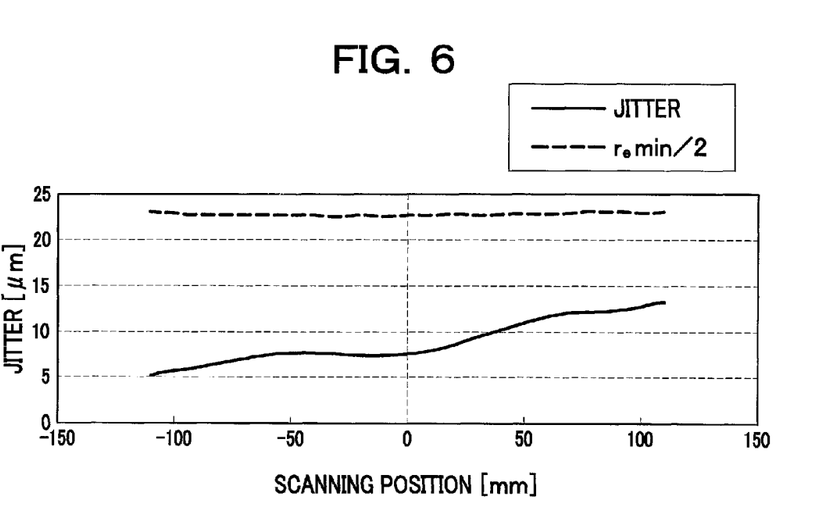
FIG. 6 is a graph obtained by plotting jitter amount according to Example 1 on a half of $r_e\min$.

According to the scanning optical apparatus of Example 1, as best seen in FIG. 6, jitter is suppressed below 15 μm at every position on the target surface 9A, namely, smaller than one-half of $r_e$min that is defined as the minimum value of $1/e^2$ beam radius on the target surface 9A in the main scanning direction. In other words, it is understood that an excellent image exposure can be performed while satisfying the above formula (4).

Figure 7:
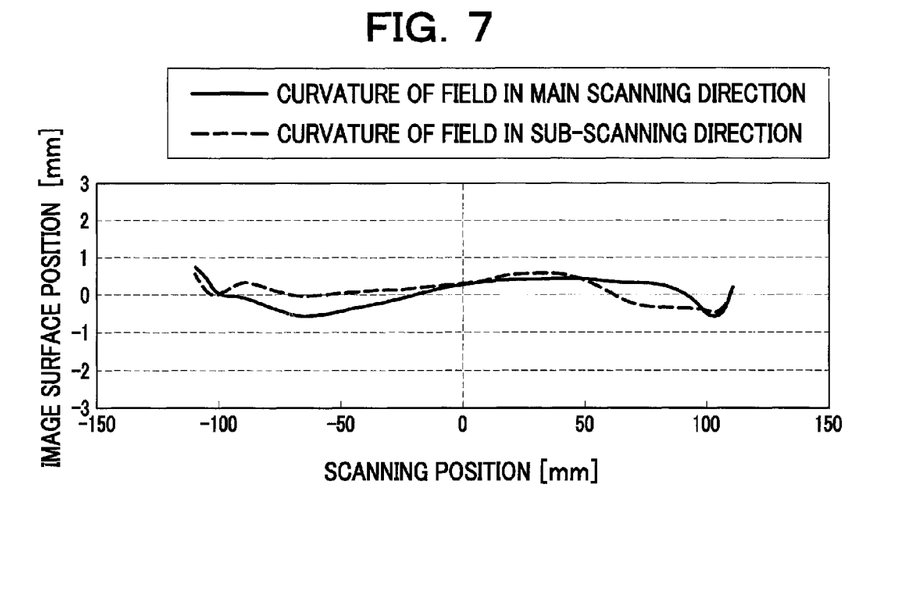
FIG. 7 is a graph showing curvatures of field according to Example 1.
Figure 8:
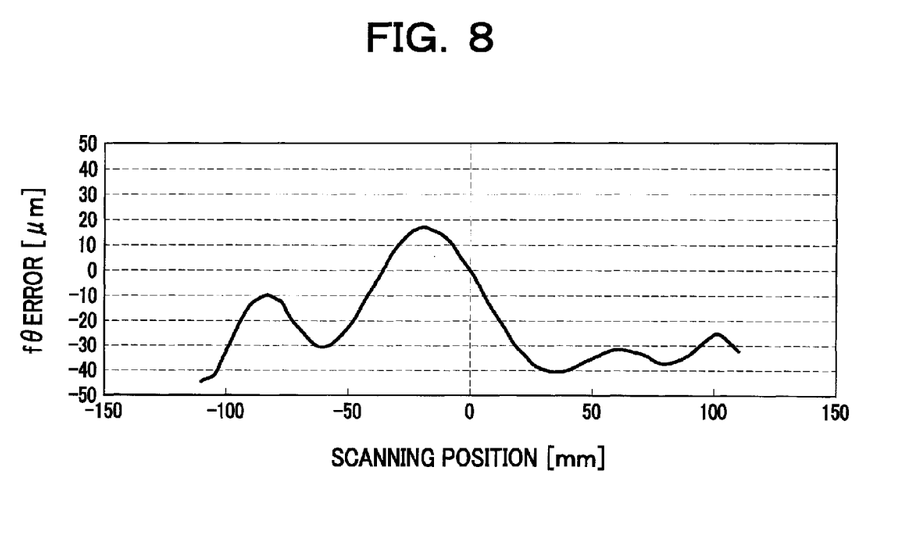
FIG. 8 is a graph showing f-theta error according to Example 1.

Further, curvatures of field in the scanning optical apparatus of Example 1 are shown in FIG. 7, which shows that the curvatures of field in the main scanning direction and the sub-scanning direction fall within the region less than ±1 mm and that the f-theta error (i.e., error obtained from an ideal image height that is calculated by y=kθ) also falls within the region less than 50 μm as shown in FIG. 8. Therefore, it is understood that a distortion of the image is reduced and a high-definition image exposure can be realized.

EXAMPLE 2

Figure 9:
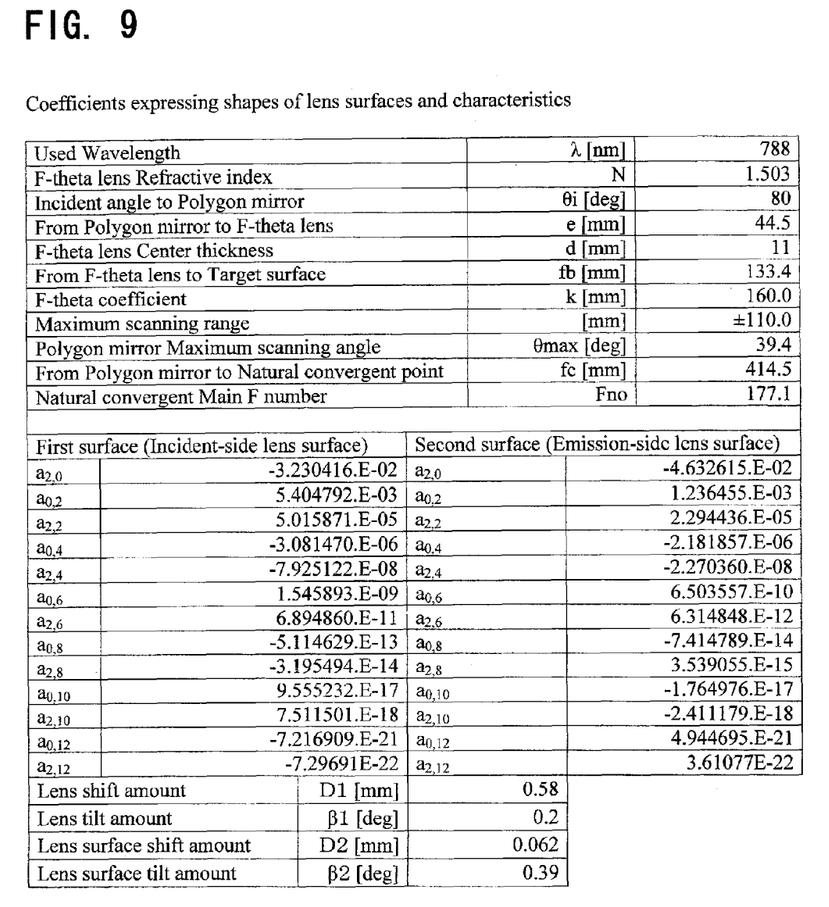
FIG. 9 is a table showing relations between coefficients expressing the shapes of lens surfaces according to Example 2 and characteristics.

Description will be given of an example in which the f-theta lens 6 is expressed by the above formula (6). In the f-theta lens 6 of the scanning optical apparatus according to Example 2, the shapes of the lens surface L1 (i.e., incident-side lens surface) and the lens surface L2 (i.e., emission-side lens surface) are given by the following formula (10), when the intersection point between each lens surface of the f-theta lens 6 and the optical axis is taken as an origin, an axis orthogonal to the optical axis in the sub-scanning plane is taken as an x-axis, an axis orthogonal to the optical axis in the main scanning plane is taken as a y-axis, and the optical axis direction is taken as a z-axis:

$$z = (a_{2,0})x^2y^0 + (a_{0,2})x^0y^2 + (a_{2,2})x^2y^2 + (a_{0,4})x^0y^4 + (a_{2,4}) \\ x^2y^4 + (a_{0,6})x^0y^6 + (a_{2,6})x^2y^6 + (a_{0,8})x^0y^8 + (a_{2,8})x^2y^8 + \\ (a_{0,10})x^0y^{10} + (a_{2,10})x^2y^{10} + (a_{0,12})x^0y^{12} + (a_{2,12}) \\ x^2y^{12} \quad (10)$$

where $(a_{2,0}), \ldots (a_{2,12})$ are constants, and values at the incident-side lens surface and at the emission-side lens surface are shown in FIG. 9.

In the above formula (10), the shape of the lens surface in the main scanning direction is determined by the following terms:

$$z = (a_{0,2})x^0 y^2 + (a_{0,4})x^0 y^4 + (a_{0,6})x^0 y^6 + (a_{0,8})x^0 y^8 + (a_{0,10})x^0 y^{10} + (a_{0,12})x^0 y^{12} \quad (11).$$

Figure 10:
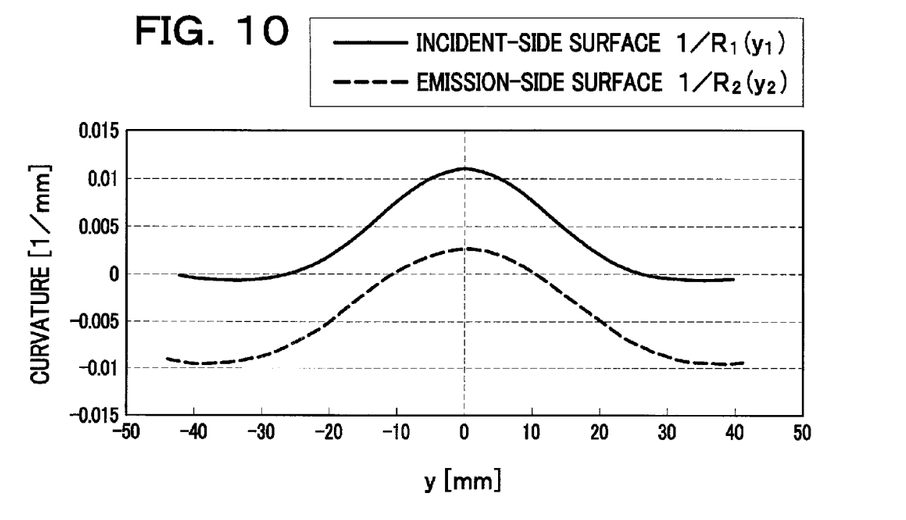
FIG. 10 is a graph showing curvature distribution of the lens surfaces according to Example 2.

Distribution of the curvature in main scanning direction obtained by this formula is shown in FIG. 10.

The f-theta lens 6 is configured such that the emission-side lens surface is shifted with respect to the incident-side lens surface by the shift amount D2 shown in FIG. 9 and is inclined at the tilt angle β2, and that the incident-side lens surface is shifted with respect to the normal line P1 by the shift amount D1 shown in FIG. 9 and is inclined at the tilt angle β1. Other arrangements and characteristics are shown in FIG. 9.

Figure 11:
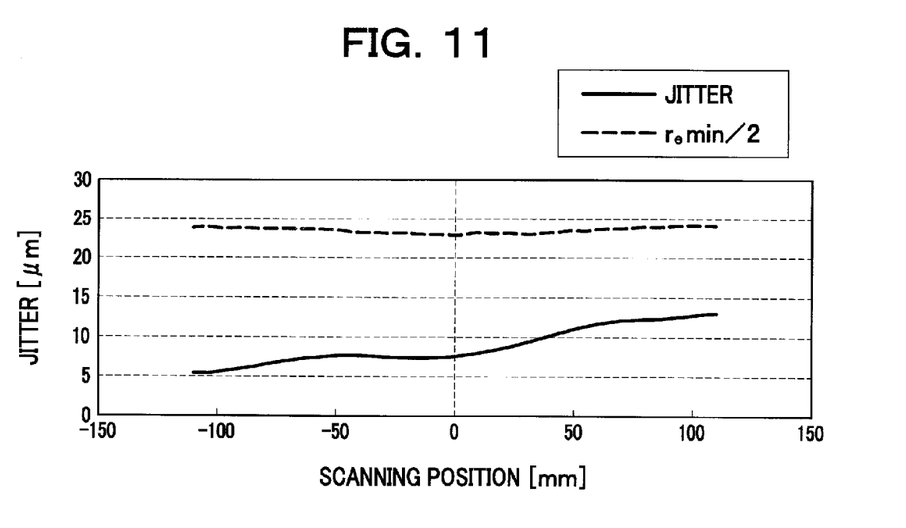
FIG. 11 is a graph obtained by plotting jitter amount according to Example 2 on a half of $r_e\min$.

According to the scanning optical apparatus of Example 2, as best seen in FIG. 11, jitter is suppressed below 15 μm at every position on the target surface 9A, namely, smaller than one-half of $r_e$min that is defined as the minimum value of $1/e^2$ beam radius on the target surface 9A in the main scanning direction. In other words, it is understood that an excellent image exposure can be performed while satisfying the above formula (4).

Figure 12:
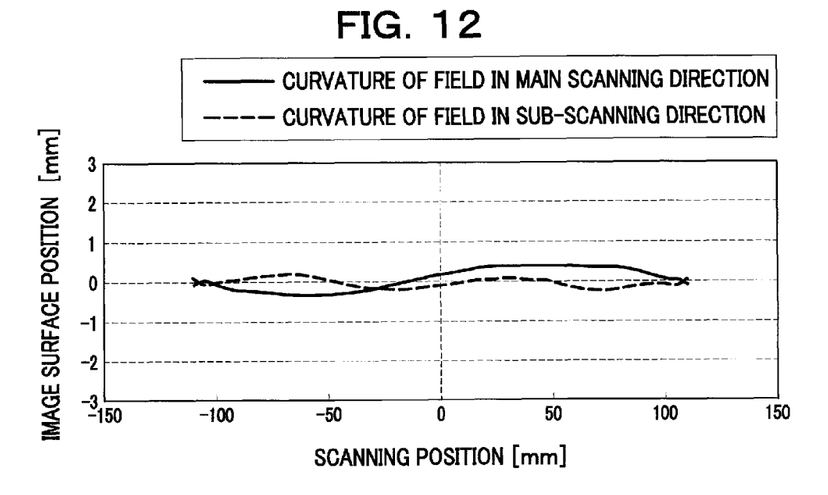
FIG. 12 is a graph showing curvatures of field according to Example 2.
Figure 13:
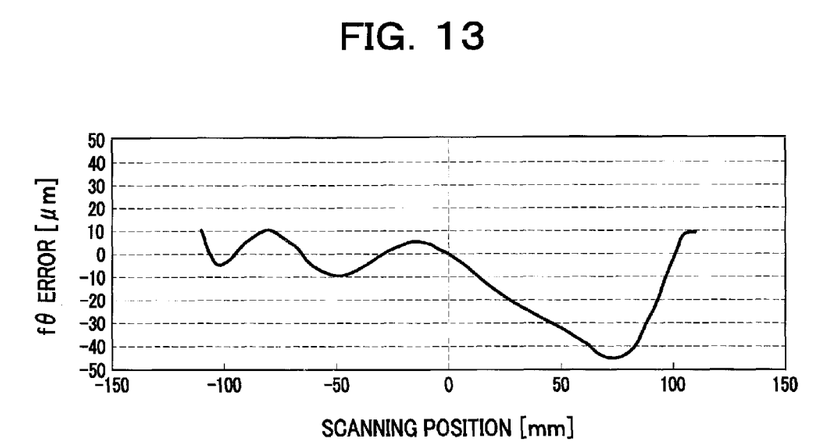
FIG. 13 is a graph showing f-theta error according to Example 2.

Further, curvatures of field in the scanning optical apparatus of Example 2 are shown in FIG. 12, which shows that the curvatures of field in the main scanning direction and the sub-scanning direction fall within the region less than ±1 mm and that the f-theta error (i.e., error obtained from an ideal image height that is calculated by y=kθ) also falls within the region less than 50 μM as shown in FIG. 13. Therefore, it is understood that a distortion of the image is reduced and a high-definition image exposure can be realized.

What is claimed is:

1. A scanning optical apparatus comprising:
   a light source;
   a first optical element configured to convert light emitted from the light source into a beam of light;
   a second optical element configured to convert the beam of light having passed through the first optical element into a linear image extending in a main scanning direction;
   a deflecting mirror configured to deflect the beam of light having passed through the second optical element in the main scanning direction; and
   a third optical element configured to convert the beam of light having been deflected by the deflecting mirror into a spot-like image and focus it on a target surface to be scanned,
   wherein the third optical element is a single lens having a pair of opposite lens surfaces, and each of the pair of lens surfaces is aspheric in a main scanning plane; and
   wherein if a distance in the main scanning direction from a point on an incident-side surface of the pair of lens surfaces, through which a principal ray of a scanning light passes, to an optical axis of the incident-side surface is $y_1$; a distance in the main scanning direction from a point on an emission-side surface of the pair of lens surfaces, through which the principal ray of the scanning light passes, to an optical axis of the emission-side surface is $y_2$; an aspheric shape of each of the pair of lens surfaces is defined by $z_j=f(y)$; a refractive index of a material from which the third optical element is made is n; a distance between the incident-side surface and the emission-side surface of the third optical element is $D(y_1, y_2)$; a radius of curvature $R_1(y_1)$ at the incident-side surface and a radius of curvature $R_2(y_2)$ at the emission-side surface are obtained by the following formula for calculating a radius of curvature:

$$R_j(y) = \frac{\left\{1 + \left(\frac{dz_j(y)}{dy}\right)^2\right\}^{\frac{3}{2}}}{\frac{d^2 z_y(y)}{dy^2}};$$

a focal distance $f_t(y_1, y_2)$ in the main scanning plane is given by the formula:

$$f_t(y_1, y_2) = \frac{1}{(n-1)\left(\frac{1}{R_1(y_1)} - \frac{1}{R_2(y_2)}\right) + \frac{(n-1)^2 D(y_1, y_2)}{n R_1(y_1) R_2(y_2)}};$$

a distance from a back principal point of the third optical element to the target surface is $S_k(y_1, y_2)$; an incident angle of the beam of light onto a mirror surface of the deflecting mirror is $\theta_i$; an emission angle of the beam of light from the mirror surface of the deflecting mirror is $\theta_e(y_1, y_2)$; an eccentric amount of the mirror surface of the deflecting mirror is $d(y_1, y_2)$; a deviation amount $h(y_1, y_2)$ of the beam of light generated due to a level difference between mirror surfaces that is derived from an eccentricity of the deflecting mirror is given by the formula:

$$h(y_1, y_2) = \frac{d(y_1, y_2) \cdot \sin(\theta_e(y_1, y_2) - \theta_i)}{\cos\theta_e(y_1, y_2) \cos((\theta_e(y_1, y_2) - \theta_i)/2)};$$

and a minimum value of $1/e^2$ beam radius on the target surface in the main scanning direction is $r_e$min, the third optical element has an aspheric shape in the main scanning plane, which satisfies the formula:

$$\left|\left(1 - \frac{S_k(y_1, y_2)}{f_t(y_1, y_2)}\right) \cdot h(y_1, y_2)\right| < \frac{r_e \min}{2}.$$

2. The scanning optical apparatus according to claim 1, wherein each of the pair of lens surfaces of the third optical element is a toric surface.

3. The scanning optical apparatus according to claim 1, wherein each of the pair of lens surfaces of the third optical element has an aspheric shape defined by:

$$z_j = \sum_{i=1}^{n} A_i y^i$$

where $A_i$ is a coefficient, and
   wherein a curvature of each lens surface in a sub-scanning plane changes continuously within an effective region of the lens surface from a point on the optical axis toward both outer ends of the lens surface.

4. The scanning optical apparatus according to claim 1, wherein each of the pair of lens surfaces of the third optical element has an aspheric shape defined by:

$$z_j = f(x, y) = \sum_m \sum_n (a_{m,n}) x^m y^n$$

where $a_{m,n}$ is a coefficient.

5. The scanning optical apparatus according to claim 1, wherein at least one of the pair of lens surfaces of the third optical element is symmetrical in the main scanning direction with respect to a sub-scanning plane passing through the optical axis.

6. The scanning optical apparatus according to claim 5, wherein the optical axis of one of the pair of lens surfaces is inclined in the main scanning plane with respect to a normal line extending from a scanning center on the target surface and/or an intersection point between the optical axis and the lens surface is shifted in the main scanning direction with respect to the normal line.

7. The scanning optical apparatus according to claim 6, wherein the optical axis of the other one of the pair of lens surfaces is inclined in the main scanning plane with respect to the normal line and/or an intersection point between the optical axis of the other lens surface and the other lens surface is shifted in the main scanning direction with respect to the normal line.

* * * * *